(12) United States Patent
Wu et al.

(10) Patent No.: US 12,493,225 B2
(45) Date of Patent: Dec. 9, 2025

(54) SINGLE-MATERIAL-DOUBLE-PROCESS PARAMETRIC LASER-WAVELENGTH CONVERTER

(71) Applicant: LEDlas Corp., Hsinchu (TW)

(72) Inventors: Ming-Hsiung Wu, Hsinchu (TW); Yen-Chieh Huang, Hsinchu (TW)

(73) Assignee: LEDlas Corp., Hsinchu (TW)

( * ) Notice: Subject to any disclaimer, the term of this patent is extended or adjusted under 35 U.S.C. 154(b) by 243 days.

(21) Appl. No.: 18/456,512

(22) Filed: Aug. 27, 2023

(65) Prior Publication Data

US 2025/0068033 A1    Feb. 27, 2025

(51) Int. Cl.
*G02F 1/39* (2006.01)
*H01S 3/00* (2006.01)
(Continued)

(52) U.S. Cl.
CPC ............... *G02F 1/392* (2021.01); *G02F 1/39* (2013.01); *H01S 3/0092* (2013.01);
(Continued)

(58) Field of Classification Search
CPC .......... G02F 1/39; G02F 1/392; H01S 3/0092; H01S 3/10007; H01S 3/1024; H01S 3/1083; H01S 3/1643
See application file for complete search history.

(56) References Cited

U.S. PATENT DOCUMENTS 6,320,886 B1 * 11/2001 Dawber .................... G02F 1/39
372/100

7,599,408 B2 * 10/2009 Vachss .................. H01S 3/2383
372/20
(Continued)

FOREIGN PATENT DOCUMENTS

EP          4060403 A1 *  9/2022  ........... G02F 1/3536
TW          200410464      6/2004
(Continued)

OTHER PUBLICATIONS

"Office Action of Taiwan Counterpart Application", issued on Aug. 1, 2024, p. 1-p. 7.

*Primary Examiner* — Daniel Petkovsek
(74) *Attorney, Agent, or Firm* — JCIPRNET

(57) ABSTRACT

A single-material-double-process parametric laser-wavelength converter includes a pump-laser source, a nonlinear optical material, a first optical reflective element, and a second optical reflective element. The pump-laser source is configured to emit a pump-laser pulse light. The nonlinear optical material receives the pump-laser pulse and generates a signal-laser pulse and a partially depleted pump-laser pulse through optical parametric amplification. The first optical reflective element is configured to reflect the signal-laser pulse back to the same nonlinear optical material. The second optical reflective element is configured to reflect the partially depleted pump-laser pulse back to the same nonlinear optical material. With an appropriate adjustment on the reflecting path lengths, the nonlinear optical material is configured to receive the temporally synchronized signal-laser pulse and the partially depleted pump-laser pulse to generate an idler output through difference frequency generation. Both optical parametric amplification and difference frequency generation occur in the same nonlinear optical material.

8 Claims, 6 Drawing Sheets

(51) Int. Cl.
*H01S 3/10* (2006.01)
*H01S 3/102* (2006.01)
*H01S 3/108* (2006.01)
*H01S 3/16* (2006.01)

(52) U.S. Cl.
CPC ........ *H01S 3/10007* (2013.01); *H01S 3/1024* (2013.01); *H01S 3/1083* (2013.01); *H01S 3/1643* (2013.01)

(56) References Cited

U.S. PATENT DOCUMENTS

| | | | |
|---|---|---|---|
| 7,706,054 B2 * | 4/2010 | Rae | G02F 1/39 359/330 |
| 10,725,359 B2 * | 7/2020 | Nawata | G02F 1/37 |
| 2002/0149836 A1 | 10/2002 | Jovanovic et al. | |
| 2004/0228372 A1 | 11/2004 | Vodopyanov et al. | |
| 2019/0305506 A1 | 10/2019 | Fu et al. | |

FOREIGN PATENT DOCUMENTS

| | | |
|---|---|---|
| TW | 201614916 | 4/2016 |
| TW | 202240315 | 10/2022 |

* cited by examiner

_(1)_
SINGLE-MATERIAL-DOUBLE-PROCESS PARAMETRIC LASER-WAVELENGTH CONVERTER

BACKGROUND

Technical Field

The invention generally relates to a laser source and, in particular, a parametric laser-wavelength converter.

Description of Related Art

There are a few methods for generating high-power lasers via laser-frequency mixing in a nonlinear optical material. For instance, quadratic optical-parametric wavelength conversion employs a laser to pump a nonlinear optical material and generate two frequency-down-converted lasers, called signal and idler. If one simultaneously injects the pump laser and a strong signal laser into the nonlinear optical material, a high-power idler laser can be generated through the so-called difference-frequency generation. In general, photon-energy conservation requires the sum of the signal-laser frequency and the idler-laser frequency equal to the pump-laser frequency, and photon-momentum conservation requires the sum of the signal-laser wavevector and the idler-laser wavevector equal to the pump-laser wavevector. The three wavevectors are not necessarily collinear.

Refer to FIG. 1. In the related art, a multiple-pump-laser and multiple-material scheme is often adopted to generate a high-power frequency-down-converted output. In such a scheme, a strong pump-laser pulse and a weak continuous-wave signal seed are first focused into a first nonlinear optical material to generate an amplified signal-laser pulse through the so-called optical-parametric-amplification (OPA) process. Subsequently, one injects the just-generated strong signal-laser pulse and a new pump-laser pulse into a second nonlinear optical material to perform difference-frequency generation (DFG) to obtain the idler laser at the difference frequency of the pump and signal-laser pulses. To have a narrow-spectral-line idler-laser output from the difference-frequency-generation process, one often employs a single-frequency pump and a narrow-spectral-line signal seed in the optical-parametric-amplification process to generate a strong narrow-spectral-line signal for the subsequent difference-frequency generation. In the related art, two expensive pump-laser pulses are used in two expensive nonlinear optical materials in such a multiple-material scheme. Stringent laser alignment is often required for multi-stage laser-wavelength conversions. Once the parametric amplification and difference-frequency-generation processes are completed, the two high-power pump-laser pulses are dumped and wasted.

Refer to FIG. 2. In the high-gain regime, a pulsed parametric amplification process can deplete the temporal center of a pump-laser pulse due to the exponential gain in the process, forming two bumps at the leading and trailing edges of the partially depleted pump pulse. However, the pump-laser energy in the two bumps is most unused and still strong. In particular, when the signal or the idler pulse temporally walks away from the pump-laser pulse due to material dispersion or non-collinear wavevector matching, the partially depleted pump-laser pulse transmitting through the nonlinear optical material is left with a peaked fresh part in a parametric amplification process. Therefore, it is the purpose of this invention to re-use the peaked fresh part of the transmitted pump-laser pulse by reflecting it back to the original nonlinear optical material to further perform difference frequency generation with the reflected signal laser pulse for generating a high-power idler pulse with high efficiency.

SUMMARY

Accordingly, the present invention is directed to overcome the drawbacks of the parametric laser sources in the related arts, including the use of multiple materials, the waste of the pump-laser energy, and stringent laser alignment in a complicated multi-stage structure. Specifically, the invention is related to a parametric laser-wavelength converter, which re-uses, recycles, and regenerates its pump-laser pulse in a single nonlinear optical material for efficient laser-wavelength conversions.

An embodiment of the present invention provides a parametric laser-wavelength converter, including a pump-laser source, a nonlinear optical material, a first optical reflective element, and a second optical reflective element. The pump-laser source is configured to emit a pump-laser pulse at a first frequency. The nonlinear optical material is configured to receive the pump-laser pulse and generate a signal-laser pulse at a second frequency and a partially depleted pump-laser pulse through optical parametric amplification. The first optical reflective element is disposed on a path of the amplified signal-laser pulse and configured to reflect the signal-laser pulse back to the same nonlinear optical material. The second optical reflective element is disposed on a path of the partially depleted pump-laser pulse and configured to reflect the partially depleted pump-laser pulse back to the same nonlinear optical material. The nonlinear optical material is configured to receive the reflected signal-laser pulse and the re-used partially depleted pump-laser pulse to generate an idler-laser output at a third frequency through difference frequency generation. The idler-laser output has a frequency or a third frequency equal to the difference between the first and second frequencies.

In the parametric laser-wavelength converter according to the embodiment of the invention, the partially depleted pump-laser pulse generated by optical parametric amplification is redirected to the nonlinear optical material again to perform difference frequency generation, so as to generate a strong idler-laser pulse. As a result, the optical parametric amplification and the difference frequency generation occur in the same nonlinear optical material, so that the second nonlinear optical material for difference frequency generation required in the related art is not needed and the cost of the parametric laser-wavelength converter is thus reduced. In addition, the structure of the single-stage parametric laser-wavelength converter of the present invention alleviates the critical laser alignment often required for multi-stage wavelength conversions in the related art.

Another embodiment of the present invention is to adjust the relative path of the reflected pump-laser pulse and the reflected signal-laser pulse so that a peaked fresh part of the partially depleted pump-laser pulse overlaps with the reflected signal-laser pulse in the same nonlinear optical material for efficient difference frequency generation.

A further embodiment of the present invention is to amplify the partially depleted pump-laser pulse before reflecting it back to the same nonlinear optical material for performing difference frequency generation with the reflected signal-laser pulse.

To make the present invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
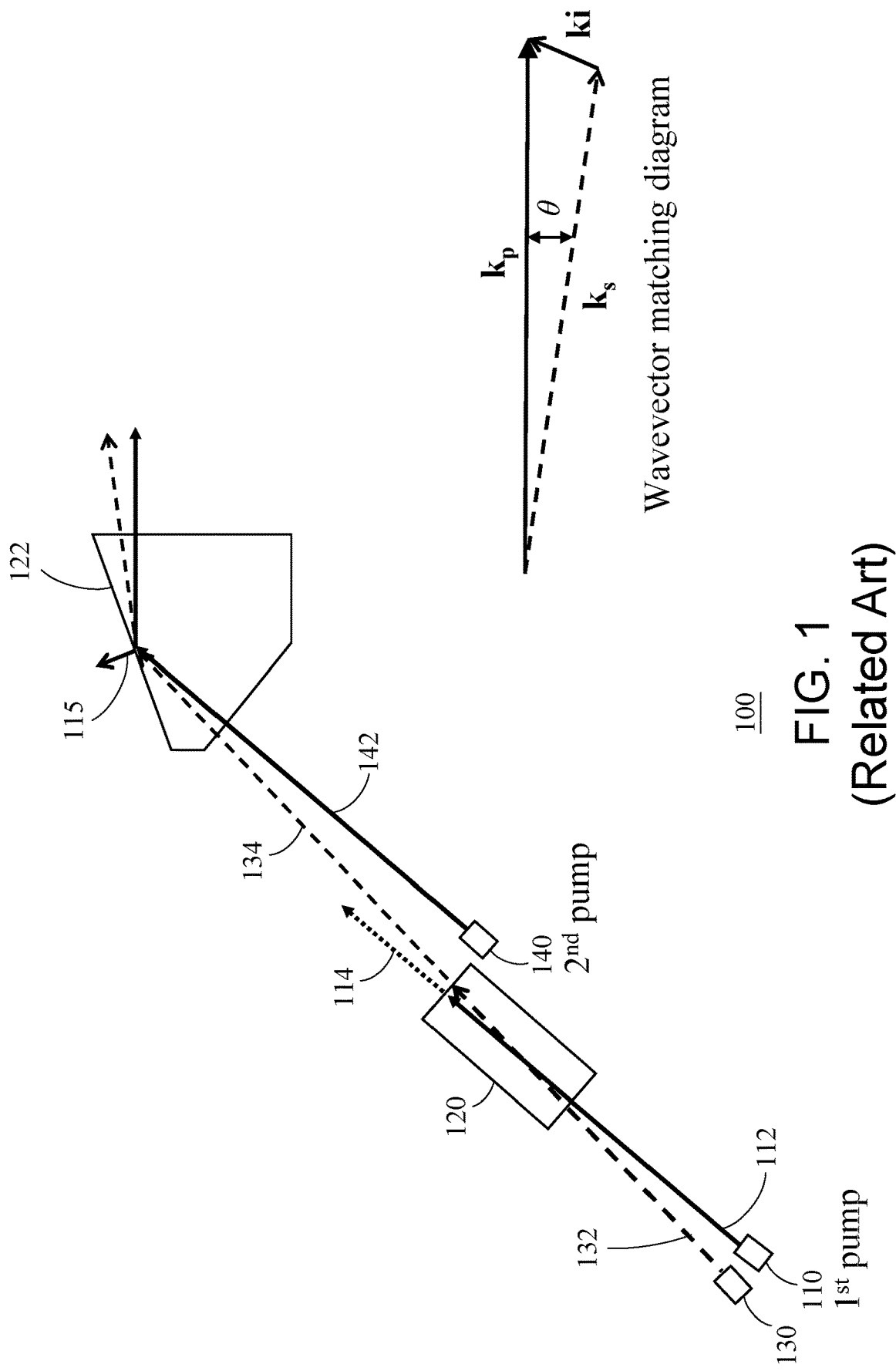
FIG. 1 is a schematic structural view of a multi-stage parametric laser-wavelength converter in the related art.

FIG. 1 is a schematic structural view of a multi-stage parametric laser-wavelength converter in the related art. With a pump laser at a first frequency $\omega_p$ (i.e. the pump-laser pulse 112), optical parametric generation in a nonlinear optical material 120 enables the simultaneous generation of a signal laser (i.e. the signal pulse 134) at a second frequency $\omega_s$ and an idler laser at a third frequency $\omega_i$ (i.e. the idler output 115). The three frequencies satisfy the relationship, $\omega_p = \omega_s + \omega_i$. By injecting a strong pump laser (i.e. the pump-laser pulse 112) and a weak signal seed (i.e. the seed laser 132) into the first nonlinear optical material 120, the weak signal seed 132 is amplified to be a strong signal laser (i.e. the signal-laser pulse 134) through the so-called optical parametric amplification. The wavevector matching diagram shows the pump-laser wavevector is the sum of the signal-laser and idler-laser wavevectors. That is, $k_p = k_s + k_i$, where k is the wavevector, θ is the angle between the pump-laser pulse 112 and the signal-laser pulse 134 in the first nonlinear optical material 120, and the subscripts p, s, and i denote the pump, signal, and idler waves, respectively, or the pump-laser pulse 112, the signal-laser pulse 134, and the idler-laser pulse 115, respectively, in FIG. 3. When θ is not equal to zero, all the waves propagate in different direction and the parametric wavelength conversion process is said to have non-collinear phase matching. When θ is equal to zero, all the waves propagate in the same direction and the parametric wavelength conversion process is said to have collinear phase matching.

When the mixing powers of the pump and signal lasers are comparable to each other, optical parametric amplification is re-phrased as difference-frequency generation. The output of the idler laser is the highest when the pump-laser intensity is equal to the signal-laser intensity. In the related art, a first pump-laser source 110 generates the first pump-laser pulse 112 and a seed laser source 130 generates a signal seed 132. The first pump-laser pulse 112 and signal seed 132 are injected into a first nonlinear optical material 120 to generate a signal-laser pulse 134 via optical parametric amplification. A second pump-laser source 140 generates a second pump-laser pulse 142 and is injected into a second nonlinear optical material 122 receiving the signal-laser pulse 134 to generate a high-power idler-laser output 115 via difference frequency generation. The second pump-laser source 140 is synchronized to the first pump-laser source 110. For the illustrated non-collinear wavevector-matching process, the nonlinear optical material 122 is cut into a shape that receives and emits the mixing waves along the surface normal of the material edges.

Figure 2:
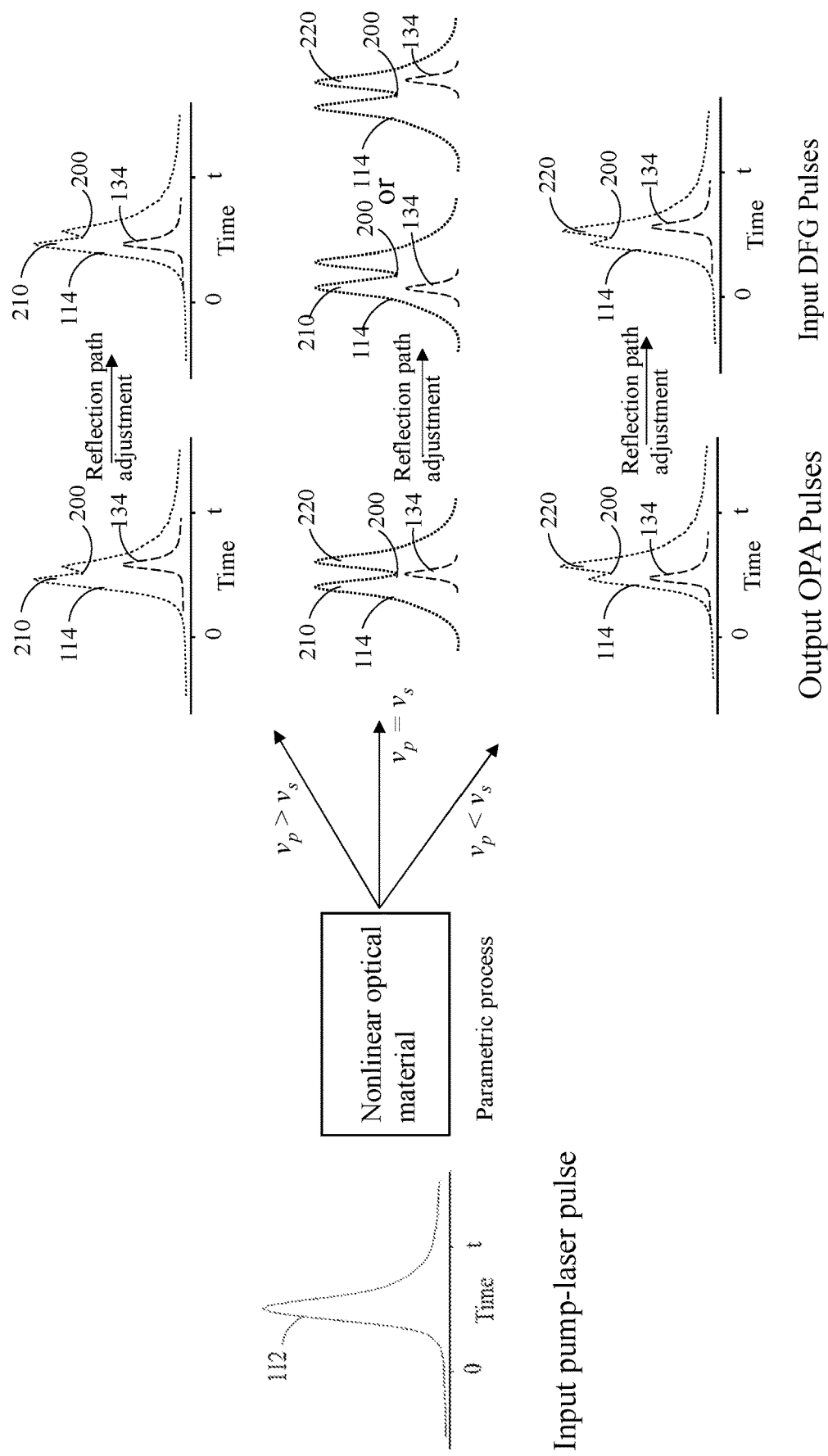
FIG. 2 depicts the temporal pulse profiles of the pump and signal lasers in a high-gain parametric amplification process.

FIG. 2 depicts the temporal profiles of the pump-laser pulse 112, the signal-laser pulse 134, and the partially depleted pump-laser pulse 114 in a high-grain parametric amplification process. Owing to the dramatic exponential gain in pulsed parametric amplification, at the output of the optical parametric amplification, the partially depleted pump-laser pulse 114 has a dip 200 near the center of the pulse, forming two humps 210, 220 about the pulse center. At the output of the optical parametric amplifier (OPA), the generated signal-laser pulse 134, energy converted from the dip of the pump-laser pulse 200, is usually shorter than the pump-laser pulse width. The two humps 210, 220 remain relatively high-power and fresh in its laser characteristics. The time delay between the pump-laser pulse 112 and signal-laser pulse 134 is given by $\Delta t_{s,p} = d \times [\cos(\theta)/v_s - 1/v_p]$, where d is the propagation distance in the nonlinear optical material and v is the group velocity of the laser pulse. When $\Delta_t$ is larger than zero, the pump-laser pulse 112 is moving faster than the signal-laser pulse 134 in the nonlinear optical material 120, resulting in strong depletion at the trailing edge of the pump-laser pulse 114. Therefore, the reflected signal-laser pulse 134 should align with the hump 210 at the leading edge of the reflected partially depleted pump-laser pulse 114 for the subsequent difference frequency generation. On the other hand, when Δt is less than zero, the reflected signal-laser pulse 134 should align with the hump 220 at the trailing edge of the reflected partially depleted pump-laser pulse 114 for the subsequent difference frequency generation. To efficiently generate the idler-laser output 115 from the subsequent difference frequency generation, this embodiment of the invention discloses a technique to first perform the pulsed optical parametric amplification and reflect both the pump-laser pulse and signal-laser pulse back to the same nonlinear optical material for difference frequency generation. However, in the nonlinear optical material 122, the shortened signal-laser pulse 134 is overlapped with one of the two humps of the partially depleted pump-laser pulse 114 to generate a high-power idler output 115. The precise temporal overlap between the pulses can be achieved by adjusting the position of the optical reflective element for the depleted pump-laser pulse 114 or signal-laser pulse 134 to achieve the necessary temporal synchronization between the reflected partially depleted pump-laser pulse 114 and the signal-laser pulse 134.

Figure 3:
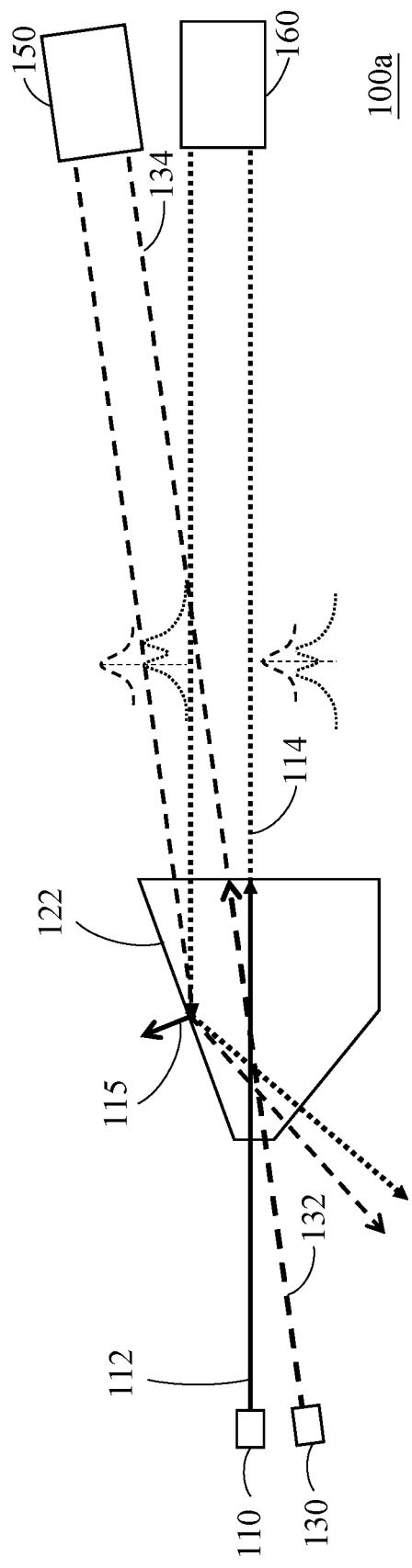
FIG. 3 is a schematic structural view of a parametric laser-wavelength converter according to an embodiment of the invention.

FIG. 3 is a schematic structural view of a parametric laser-wavelength converter according to an embodiment of the invention. Referring to FIG. 3, the parametric laser-wavelength converter 100a in this embodiment includes a pump-laser source 110, a nonlinear optical material 122, a first optical reflective element 150, and a second optical reflective element 160. The pump-laser source 110 is configured to emit a pump-laser pulse 112 at a first frequency. The nonlinear optical material 122 is disposed on a path of the pump-laser pulse 112 and configured to receive the pump-laser pulse 112 and generate a signal-laser pulse 134 and a partially depleted pump-laser pulse 114 through optical parametric generation. In this embodiment, the parametric laser-wavelength converter 100a further includes a seed laser source 130 configured to emit a seed laser 132, wherein the nonlinear optical material 122 is configured to receive the pump-laser pulse 112 and the seed laser 132 to generate the signal-laser pulse 134 and the partially depleted pump-laser pulse 114 through optical parametric amplification. In this embodiment, the pump-laser pulse 112 is, for example, a single-frequency laser, and the seed laser 132 is, for example, a narrow-spectral-line continuous-wave signal. In this embodiment, the seed laser source 130 is configured to emit an amplified signal pulse via optical parametric amplification, and the seed laser source 130 is, for example, a narrow-spectral-line continuous-wave laser source. Additionally, the pump-laser pulse 112 and the seed laser 132 are injected into the nonlinear optical material 122 to generate an amplified narrow-spectral-line signal-laser pulse 134 and a partially depleted pump-laser pulse 114 through optical parametric amplification.

The first optical reflective element 150 is disposed on a path of the signal-laser pulse 134 and configured to reflect the signal-laser pulse 134 back to the nonlinear optical material 122. The second optical reflective element 160 is disposed on a path of the partially depleted pump-laser pulse 114 and configured to reflect the partially depleted pump-laser pulse 114 back to the same nonlinear optical material 122. The nonlinear optical material 122 is configured to receive the signal-laser pulse 134 and the partially depleted pump-laser pulse 114 to generate an idler-laser output 115 at a third frequency equal to the difference of the first frequency and the second frequency through difference frequency generation. In this embodiment, the first optical reflective element 150 and the second optical reflective element 160 are, for example, reflectors.

In the parametric laser-wavelength converter 100a of this embodiment, the partially depleted pump-laser pulse 114 generated by optical parametric amplification is reflected and redirected into the same nonlinear optical material 122 again to perform difference frequency generation with the signal-laser pulse 134, so as to produce a high-power idler-laser output 115. As a result, the optical parametric amplification and the difference frequency generation occur in the same nonlinear optical material 122, so that another nonlinear optical material for difference frequency generation in the related art is not needed and the cost of the parametric laser-wavelength converter is thus reduced, and the structure of the parametric laser-wavelength converter 100a is thus simplified.

In this embodiment, an optical path length between the nonlinear optical material 122 and the first optical reflective element 150 is adjusted differently from an optical path length between the nonlinear optical material 122 and the second optical reflective element 160, so that a fresh hump of the partially depleted pump-laser pulse 114 overlaps with the signal-laser pulse 134 when the partially depleted pump-laser pulse 114 and the signal-laser pulse 134 re-enter the nonlinear optical material 122 via reflections from the second optical reflective element 160 and the first optical reflective element 150, respectively.

Specifically, in this embodiment, a pump-laser pulse (i.e. the initial pump-laser pulse 112 and the partially depleted pump-laser pulse 114) is used to simultaneously perform optical parametric amplification and difference frequency generation in a single nonlinear optical material 120. In an embodiment, the nonlinear optical material 122 has a quadratic nonlinear susceptibility.

Figure 4:
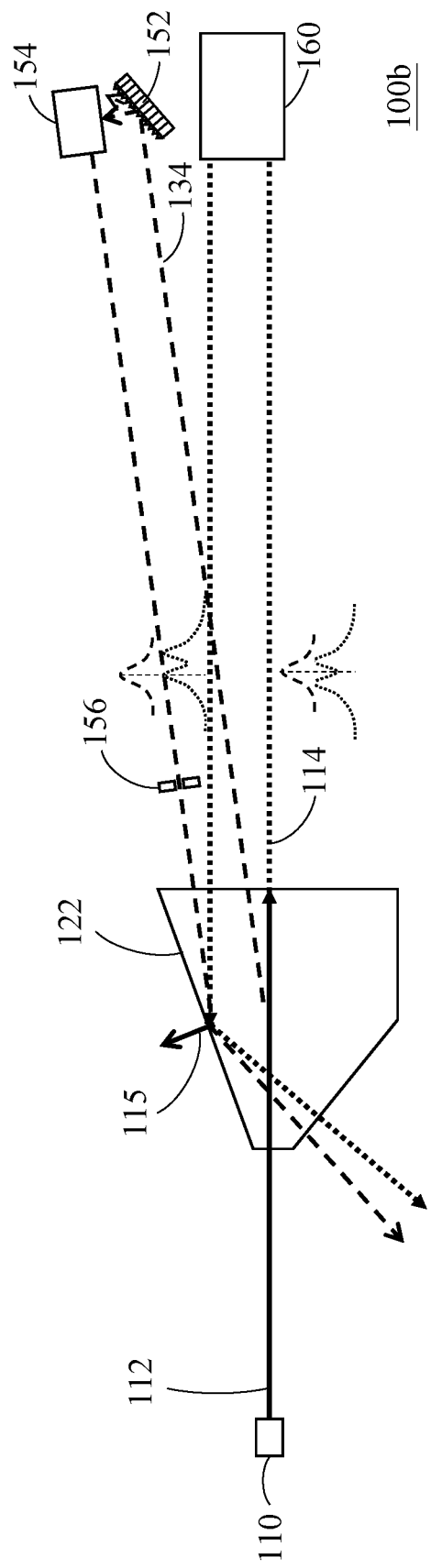
FIG. 4 is a schematic structural view of a parametric laser-wavelength converter according to another embodiment of the invention.

FIG. 4 is a schematic structural view of a parametric laser-wavelength converter according to another embodiment of the invention. Referring to FIG. 4, the parametric laser-wavelength converter 100b in this embodiment is similar to the parametric laser-wavelength converter 100a in FIG. 4, and the main difference therebetween is as follows. In the parametric laser-wavelength converter 100b in this embodiment, the seed laser source 130, as shown in FIG. 1, is not adopted. Instead, the signal pulse is generated by the amplification of the vacuum noise by the intense pump pulse in the nonlinear optical material. As a result, the generated signal pulse is relatively broadband. To limit the signal bandwidth and generate a narrow-line idler, in this embodiment, the first optical reflective element includes a grating 152 and an optical reflector 154, and the parametric laser-wavelength converter 100b further includes an aperture 156 disposed between the grating 152 and the nonlinear optical material 122 and configured to allow the signal-laser pulse 134 with a specific wavelength to pass through. After passing through the aperture 156, the signal-laser pulse 134 have a narrow spectral linewidth for the subsequent difference frequency generation.

Figure 5:
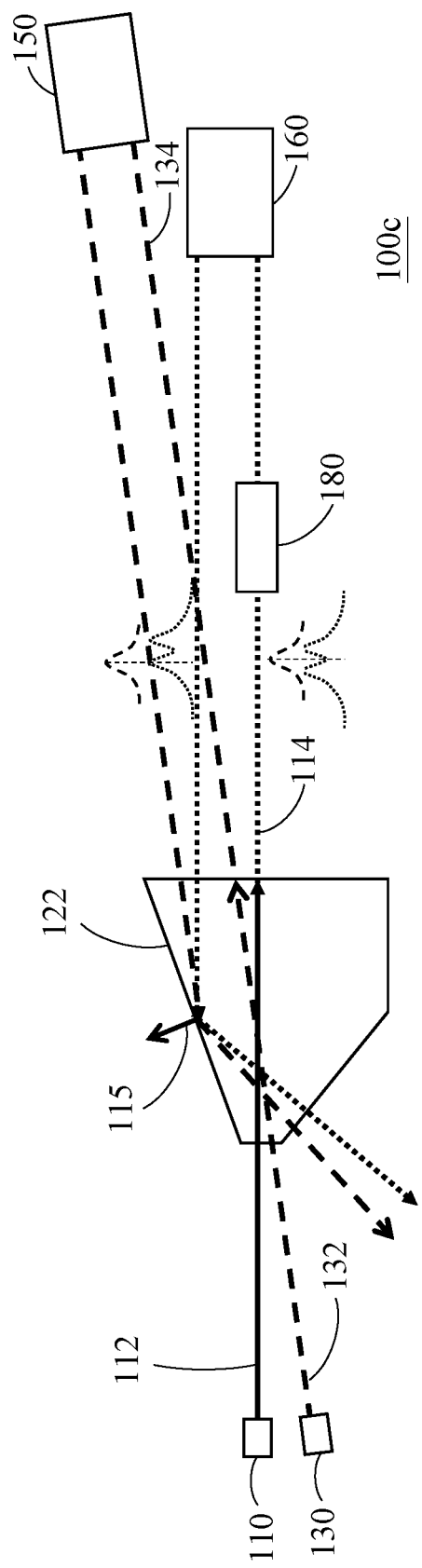
FIG. 5 is a schematic structural view of a parametric laser-wavelength converter according to another embodiment of the invention.

FIG. 5 is a schematic structural view of a parametric laser-wavelength converter according to another embodiment of the invention. Referring to FIG. 5, the parametric laser-wavelength converter 100c in this embodiment is similar to the parametric laser-wavelength converter 100a in FIG. 3, and the main difference therebetween is as follows. In this embodiment, the parametric laser-wavelength converter 100c further includes a laser amplifier 180. The laser amplifier 180 is disposed on a path of the partially depleted pump-laser pulse 114. In this embodiment, the laser amplifier 180 is a laser gain module, for example, an optically-pumped neodymium-doped yttrium aluminum garnet (Nd:YAG) module, if the pump laser wavelength is 1064 nm. In an embodiment, the laser amplifier 180 contains a laser gain material selected from one of Nd:YAG, neodymium-doped yttrium orthovanadate (Nd:YVO$_4$), Neodymium-doped yttrium lithium fluoride (Nd:YLF), and ytterbium-doped yttrium aluminum garnet (Yb:YAG). The laser amplifier 180 is used to boost up the energy of the partially depleted pump-laser pulse 114 re-entering the nonlinear optical material 122 to further increase the output power of the idler laser 115 via difference frequency generation. The laser gain of the laser amplifier 180 can replenish the partially depleted pump pulse and even fills up the dip in the pulse center to make the pulse synchronization easier for the subsequent difference frequency generation.

Figure 6:
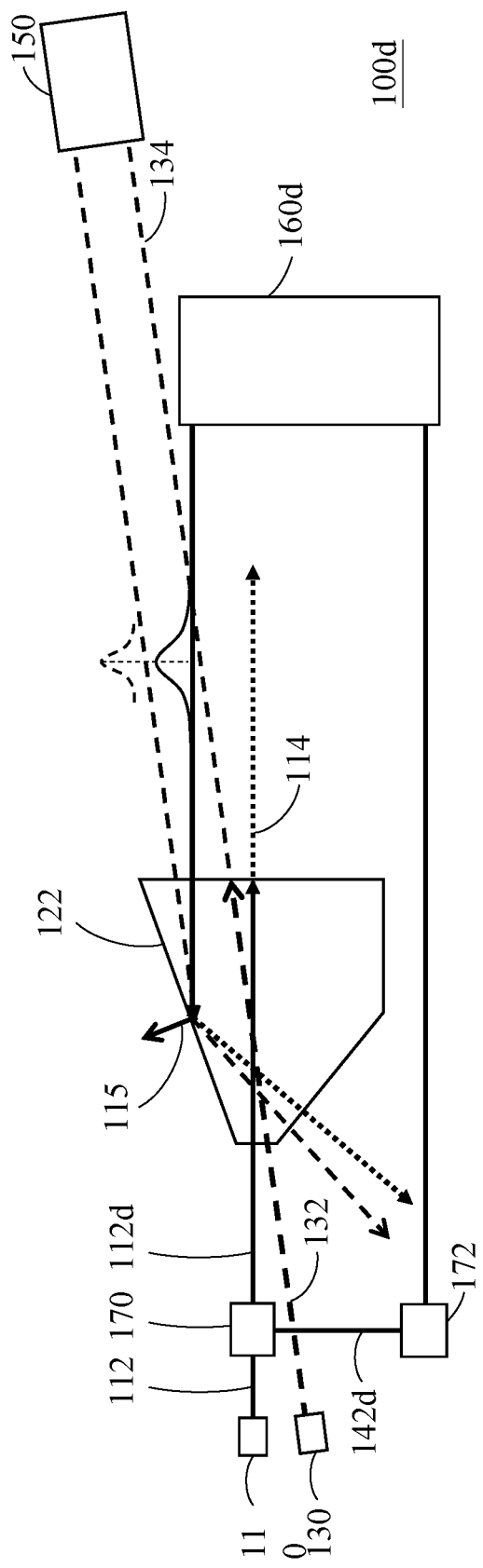
FIG. 6 is a schematic structural view of a parametric laser-wavelength converter according to another embodiment of the invention.

FIG. 6 is a schematic structural view of a parametric laser-wavelength converter according to an additional embodiment of the invention. Referring to FIG. 6, the parametric laser-wavelength converter 100d in this embodiment is similar to the parametric laser-wavelength converter 100a in FIG. 3, and the main difference therebetween is as follows. In this embodiment, with a beam splitter 170, the pump pulse 112 is first split into two parts with the first part 112d for optical parametric amplification and the second part 142d for subsequent difference frequency generation with the reflected signal-laser pulse. The optical parametric amplification and the difference frequency generation are performed in the same nonlinear optical material 122. An optical reflector 172 is used to reflect the second part 142d to the second optical reflective element 160d. In this embodiment, the initial pump pulse is generated with enough energy from a high-power laser source for performing both the optical parametric amplification and difference frequency generation. The advantage of this embodiment is that, without a depletion dip in the second pump pulse, the pulse synchronization for the difference frequency generation is eased.

In conclusion, in the parametric laser-wavelength converter according to the embodiments of the invention, the partially depleted pump-laser pulse generated by the optical parametric process is redirected to the nonlinear optical material again to perform difference frequency generation, so as to generate a high-power idler output. As a result, the optical parametric amplification and the difference frequency generation occur in the same nonlinear optical material, so that another nonlinear optical material often adopted in the related arts for difference frequency generation is not needed and the cost of the parametric laser-wavelength converter of the present invention is thus reduced, and the structure of the parametric laser-wavelength converter is thus simplified.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A parametric laser-wavelength converter for generating laser radiation, comprising:
   a pump-laser source configured to emit a pump-laser pulse at a first frequency;
   a nonlinear optical material configured to receive the pump-laser pulse and generate a signal-laser pulse at a second frequency and a partially depleted pump pulse through optical parametric amplification;
   a first optical reflective element configured to reflect the signal-laser pulse back to the nonlinear optical material; and
   a second optical reflective element configured to reflect the partially depleted pump-laser pulse back to the nonlinear optical material for difference frequency generation, wherein the nonlinear optical material is configured to receive the signal-laser pulse and the partially depleted pump-laser pulse to generate an idler-laser output at a third frequency equal to the difference of the first frequency and the second frequency,
   wherein the first optical reflective element contains a grating, an optical reflector, and further comprises an aperture disposed between the grating and the nonlinear optical material and configured to allow the signal-laser pulse with a specific wavelength and linewidth to pass through.

2. The parametric laser-wavelength converter according to claim 1, wherein the nonlinear optical material has a quadratic nonlinear susceptibility.

3. The parametric laser-wavelength converter according to claim 1, wherein an optical path length between the nonlinear optical material and the first optical reflective element is different from an optical path length between the nonlinear optical material and the second optical reflective element, which makes a hump of the partially depleted pump-laser pulse overlaps with the signal-laser pulse when the partially depleted pump-laser pulse and the signal-laser pulse re-enter the nonlinear optical material via reflections from the second optical reflective element and the first optical reflective element, respectively.

4. The parametric laser-wavelength converter according to claim 1 further comprises a seed laser source configured to emit an amplified signal pulse via optical parametric amplification.

5. The parametric laser-wavelength converter according to claim 4, wherein the seed laser source is a narrow-spectral-line continuous-wave laser source.

6. The parametric laser-wavelength converter according to claim 1 further comprises a laser amplifier configured to increase the energy of the partially depleted pump-laser pulse re-entering the nonlinear optical material.

7. The parametric laser-wavelength converter according to claim 6, wherein the laser amplifier contains a laser gain material selected from one of Nd:YAG, Nd:YVO$_4$, Nd:YLF, and Yb:YAG.

8. A parametric laser-wavelength converter for generating laser radiation, comprising:
   a pump-laser source configured to emit a pump-laser pulse at a first frequency;
   a nonlinear optical material configured to receive the pump-laser pulse and generate a signal-laser pulse at a second frequency and a partially depleted pump pulse through optical parametric amplification;
   a first optical reflective element configured to reflect the signal-laser pulse back to the nonlinear optical material; and
   a second optical reflective element configured to reflect the partially depleted pump-laser pulse back to the nonlinear optical material for difference frequency generation, wherein the nonlinear optical material is configured to receive the signal-laser pulse and the partially depleted pump-laser pulse to generate an idler-laser output at a third frequency equal to the difference of the first frequency and the second frequency, wherein the pump-laser pulse is split into two pulses with the first pulse to perform the optical parametric generation and the second pulse to perform the subsequent difference frequency generation in the same nonlinear optical material.

* * * * *